United States Patent
Li

(10) Patent No.: US 10,800,256 B2
(45) Date of Patent: Oct. 13, 2020

(54) ELECTRIC GO-KART

(71) Applicant: Shenzhen Zhouwu Technology Co., Ltd., Shenzhen (CN)

(72) Inventor: Xing-Rui Li, Shenzhen (CN)

(73) Assignee: Shenzhen Zhouwu Technology Co., Ltd., Shenzhen (CN)

( * ) Notice: Subject to any disclaimer, the term of this patent is extended or adjusted under 35 U.S.C. 154(b) by 189 days.

(21) Appl. No.: 16/028,649

(22) Filed: Jul. 6, 2018

(65) Prior Publication Data

US 2019/0315226 A1    Oct. 17, 2019

(30) Foreign Application Priority Data

Apr. 13, 2018   (CN) .................... 2018 2 0559667 U

(51) Int. Cl.
*B60K 26/02*        (2006.01)

(52) U.S. Cl.
CPC ........ *B60K 26/02* (2013.01); *B60K 2026/025* (2013.01); *B60Y 2200/86* (2013.01); *B60Y 2200/91* (2013.01); *B60Y 2300/60* (2013.01); *B60Y 2400/4024* (2013.01)

(58) Field of Classification Search
CPC .............. B60K 26/02; B60K 2026/025; B60Y 2200/86; B60Y 2200/91
See application file for complete search history.

(56) References Cited

U.S. PATENT DOCUMENTS

| | | | | | |
|---|---|---|---|---|---|
| 3,533,484 | A | * | 10/1970 | Wood, Jr. ................ | B62M 6/65 180/206.4 |
| 3,669,468 | A | * | 6/1972 | Rich ....................... | B62K 9/02 280/267 |
| 3,799,283 | A | * | 3/1974 | Freber ..................... | B60G 9/00 180/56 |
| 3,960,392 | A | * | 6/1976 | Read ....................... | B62K 9/02 280/282 |
| 4,103,921 | A | * | 8/1978 | Brooks ................... | B62D 21/183 280/259 |
| 4,198,072 | A | * | 4/1980 | Hopkins ................ | B62K 3/005 280/259 |
| 4,279,429 | A | * | 7/1981 | Hopkins ................ | B62K 3/005 280/266 |
| 4,281,844 | A | * | 8/1981 | Jackman ................. | B62K 9/02 280/263 |
| 4,896,899 | A | * | 1/1990 | Lawrence ............... | B60B 5/02 152/409 |
| 5,265,690 | A | * | 11/1993 | Amundsen ........... | B62D 21/183 180/311 |
| 5,568,935 | A | * | 10/1996 | Mason .................. | B62K 3/005 280/266 |

(Continued)

*Primary Examiner* — Jacob D Knutson
*Assistant Examiner* — Michael R Stabley
(74) *Attorney, Agent, or Firm* — ScienBiziP, P.C.

(57) ABSTRACT

An electric go-kart includes a frame and a crossbar. The crossbar is fixed to the frame and extends transversely to a left and right side of the frame. An accommodation box is rotationally coupled to each of the left and right side of the crossbar by a connector. A wheel is installed on an outer end of each accommodation box. A steering rod includes a one end fixed to the connector. A support rod is located at a front end of the frame. A stabilizing wheel is pivotably coupled to a front end of the support rod. A seat is fixed on a top side of the frame. A battery is located within the frame.

11 Claims, 8 Drawing Sheets

(56) References Cited

U.S. PATENT DOCUMENTS

| | | | | |
|---|---|---|---|---|
| 6,808,188 | B1* | 10/2004 | Fan | B62H 1/12 |
| | | | | 280/263 |
| 7,552,934 | B2* | 6/2009 | Lee | B62K 3/005 |
| | | | | 280/266 |
| 7,823,675 | B2* | 11/2010 | Kermani | B62D 9/00 |
| | | | | 180/210 |
| 8,820,460 | B2* | 9/2014 | Chen | B60L 50/66 |
| | | | | 180/210 |
| 9,033,356 | B2* | 5/2015 | Xiao | B62M 1/24 |
| | | | | 280/253 |
| 2011/0177903 | A1* | 7/2011 | Campbell | B60K 7/0007 |
| | | | | 475/149 |
| 2012/0256389 | A1* | 10/2012 | Chen | B62J 6/00 |
| | | | | 280/259 |
| 2015/0328994 | A1* | 11/2015 | Chen | B60K 1/04 |
| | | | | 180/65.31 |

* cited by examiner

ELECTRIC GO-KART

FIELD

The subject matter herein generally relates to go-karts.

BACKGROUND

An electric go-kart is described in Chinese patent CN201720609814.4. The electric go-kart has four wheels; two front wheels of the go-kart are controlled to control a movement direction of the electric go-kart. However, this kind of electric go-kart is large and inconvenient to transport or store. Additionally, the movement direction of the electric go-kart is controlled by the two front wheels turning simultaneously. Thus, operation of the electric go-kart is not as smooth and not as safe as desired.

BRIEF DESCRIPTION OF THE DRAWINGS

Implementations of the present disclosure will now be described, by way of example only, with reference to the attached figures.

DETAILED DESCRIPTION

Figure 1:
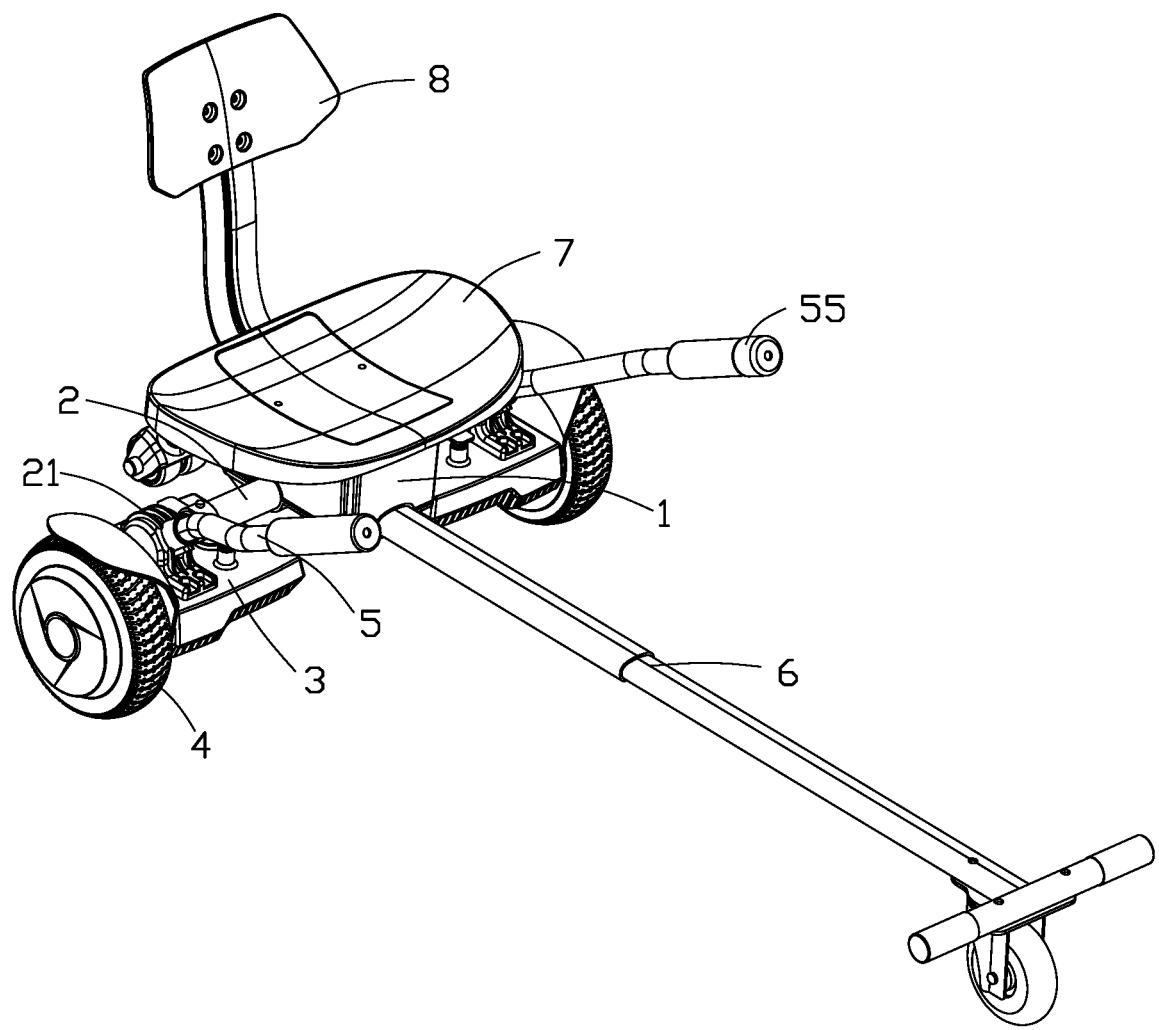
FIG. 1 is an assembled, isometric view of an embodiment of an electric go-kart in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIGS. 1-8 illustrate an embodiment of an electric go-kart. The electric go-kart includes a frame 1 and a crossbar 2. The crossbar 2 is transversely fixed to the frame 1 and extends to the left and right sides of the frame 1. Each of the left and right side of the crossbar 2 is rotationally coupled to an accommodation box 3 by a connector 21. A wheel 4 is installed on an outer end of each accommodation box 3. As described below, the accommodation box 3 includes a driving control system for controlling a motor of the wheel 4. A first end of a steering rod 5 is fixed to each connector 21. A support rod 6 is located at a front side of the frame 1. A front end of the support rod 6 includes, as described below, a pivotable stabilizing wheel 65. A seat 7 is fixed to a top side of the frame 1. A battery 12 is received within the frame 1.

There are two accommodation boxes 3, two wheels 4, and two steering rods 5, and each of the accommodation box 3, the wheel 4, and the steering rod 5 is located on a left side and a right side of the seat 7. Each of the two steering rods 5 is rotatable around an axis of the crossbar 2.

Figure 4:
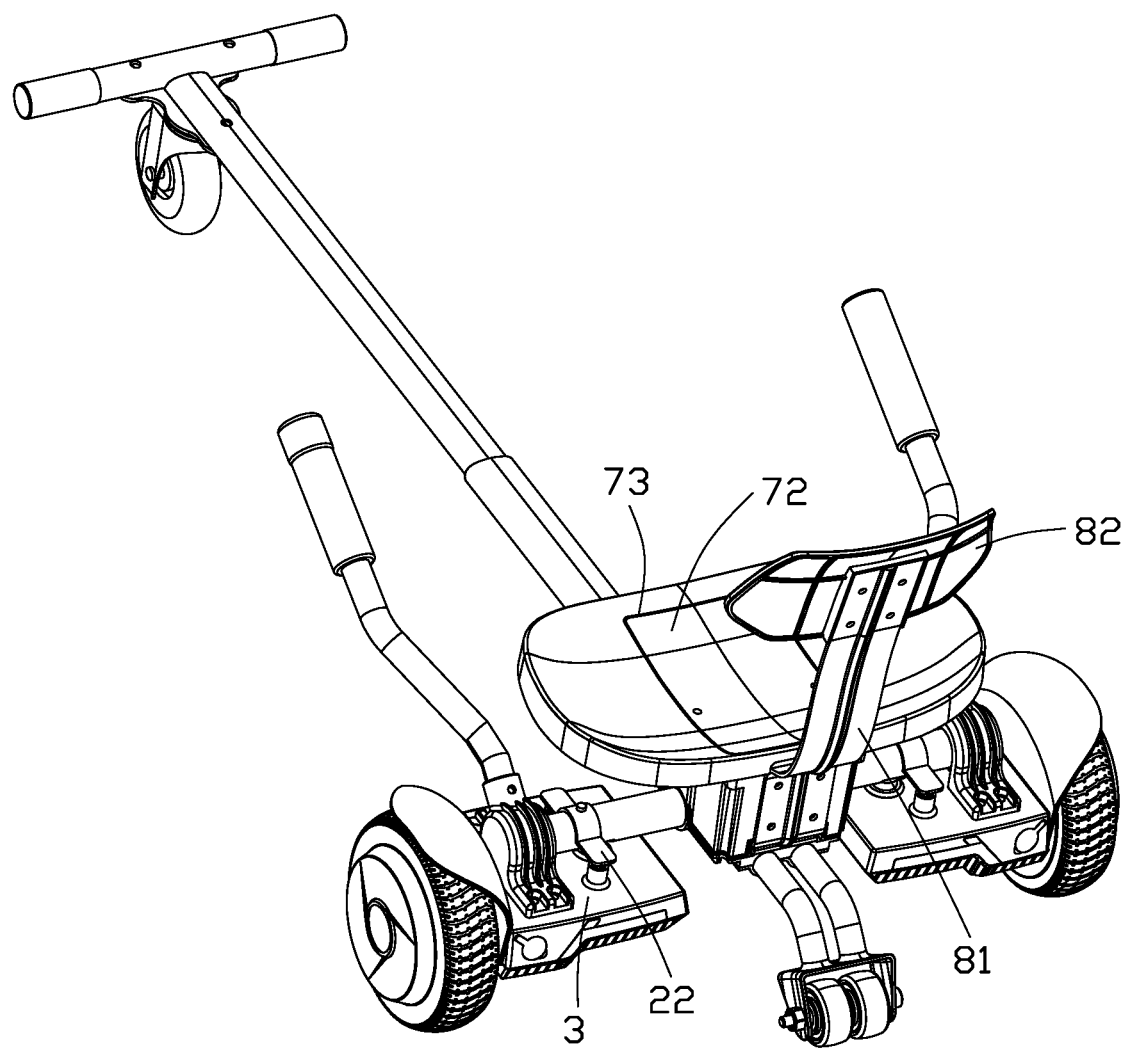
FIG. 4 is another isometric view of the electric go-kart in FIG. 1.
Figure 5:
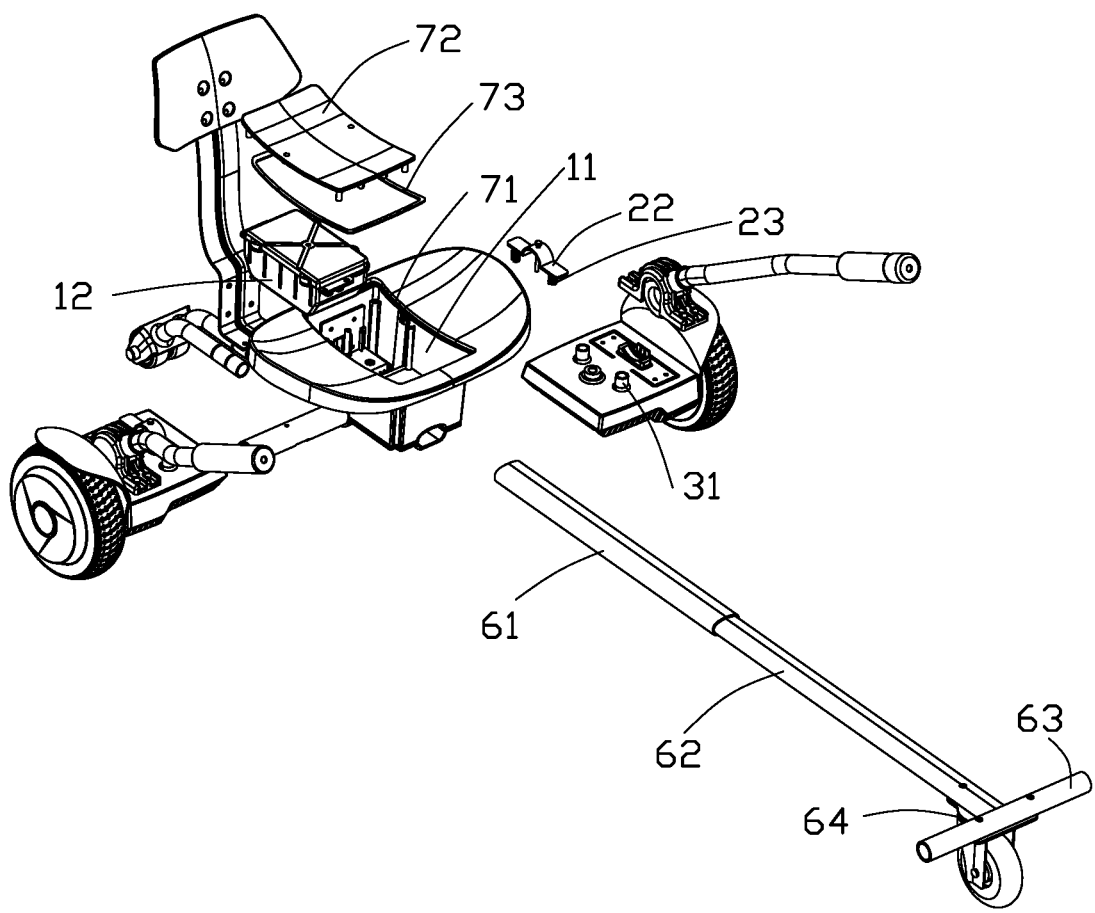
FIG. 5 is an exploded, isometric view of the electric go-kart in FIG. 1.

Referring to FIGS. 4 and 5, a cavity 11 is defined in a middle of the frame 1 for receiving the battery 12, such as a removable battery pack, therein. The seat 7 defines an opening 71 facing a top of the cavity 11. The seat 7 includes an in-seat cover 72 having a size corresponding to a size of the opening 71. The in-seat cover 72 is a part of the seat 7 when the electric go-kart is in use. The in-seat cover 72 is easily removable to remove the battery 12 if the electric go-kart needs to be disassembled or repaired. Furthermore, a seal 73 is located between the in-seat cover 72 and an outer edge of the opening 71. The seal 73 can prevent water and dust from entering the cavity 11 to maintain a life of the battery pack.

The accommodation box 3 includes a driving control system for driving a motor of the wheel 4. The driving control system is powered by the battery 12. The driving control system includes a touch switch (not shown) for powering on and turning off the electric go-kart. The touch switch circuit is closed by applying a pressure to the touch switch, and the circuit is opened by releasing a pressure on the touch switch. Touch switches are known in the art; thus, they will not be described in detail here.

Referring to FIG. 4, the electric go-kart further includes a back support 8. The back support 8 includes a mounting post 81 and a back rest 82. A lower end of the mounting post 81 is fixed to the frame 1. An upper end of the mounting post 81 is coupled to the backrest 82.

Figure 6:
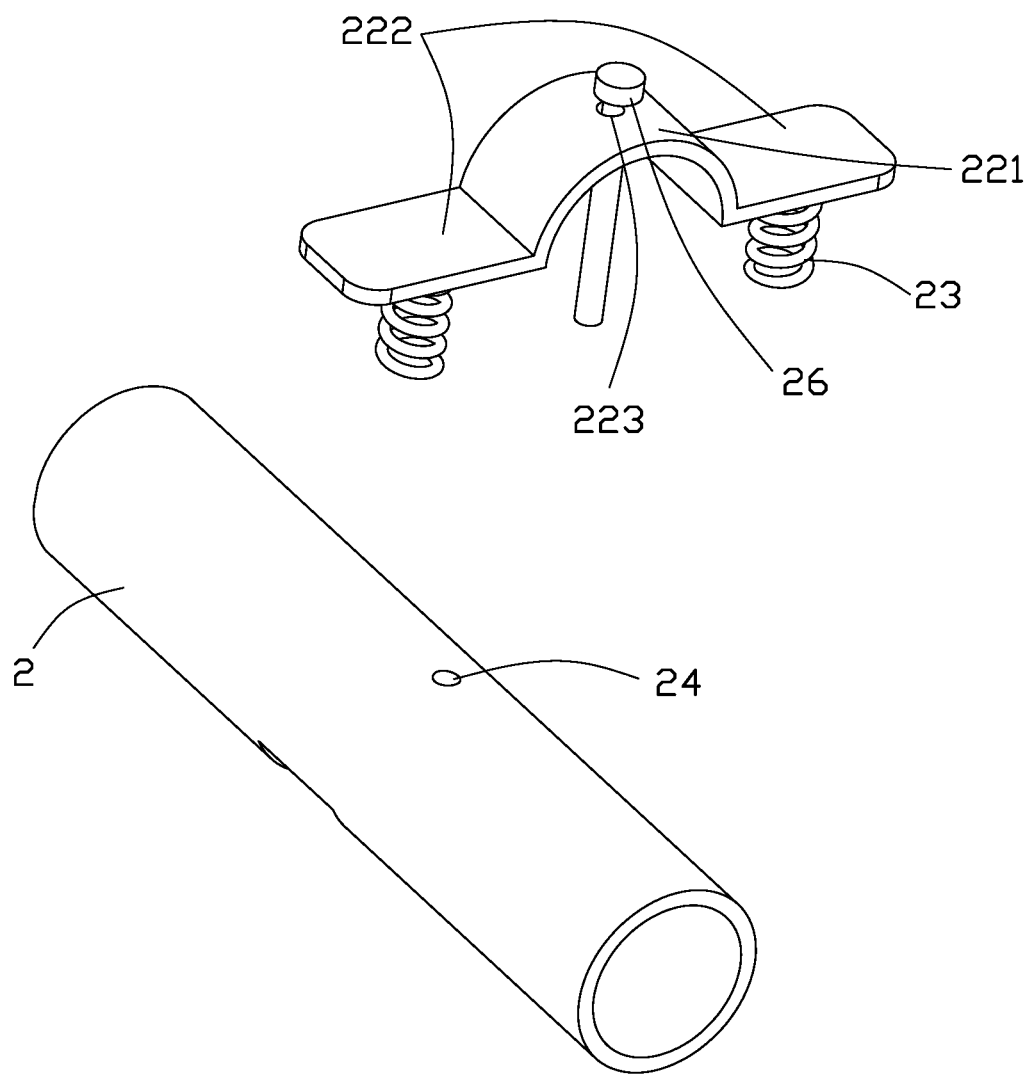
FIG. 6 shows a crossbar and a limiting structure of the electric go-kart.

Referring to FIGS. 5 and 6, the accommodation box 3 includes a rotation limiting structure. The rotation limiting structure includes a limiting plate 22, a column 31, and a spring 23. The limiting plate 22 bridges over and is fixed over the crossbar 2. A bottom side of two ends of the limiting plate 22 is fixed to the spring 23. The column 31 is located on an upper side of the accommodation box 3 and defines an insertion hole. A lower portion of the spring 23 is inserted into the insertion hole. The limiting plate 22 is generally "Ω" shaped. A middle portion of the limiting plate 22 is a bridge section 221, and opposite sides of the bridge section 221 are connecting flanges 222. A curvature of an inner surface of the bridge section 221 matches a curvature of an outer surface of the crossbar 2. The bridge section 221 is fixed over the crossbar 2. A bottom side of the connecting flanges 222 is fixed to an upper end of the spring 23, such as by welding. The crossbar 2 defines a threaded hole 24, and the bridge section 221 defines a through hole 223. A screw 26 is passed through the through hole 223 and the threaded hole 24 to fix the limiting plate 22 on the crossbar 2. When the crossbar 2 rotates relative to the accommodation box 3 beyond a certain point, a bottom of the column 31 presses against the spring 23 in order to buffer and limit a rotation angle.

Figure 7:
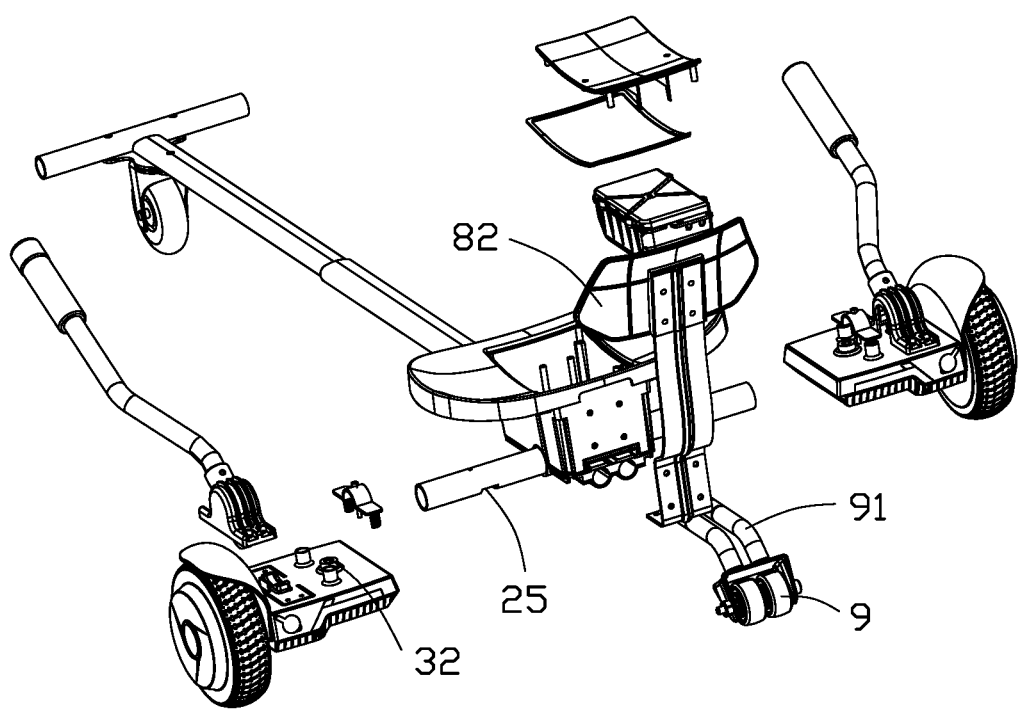
FIG. 7 is another exploded, isometric view of the electric go-kart in FIG. 1.
Figure 8:
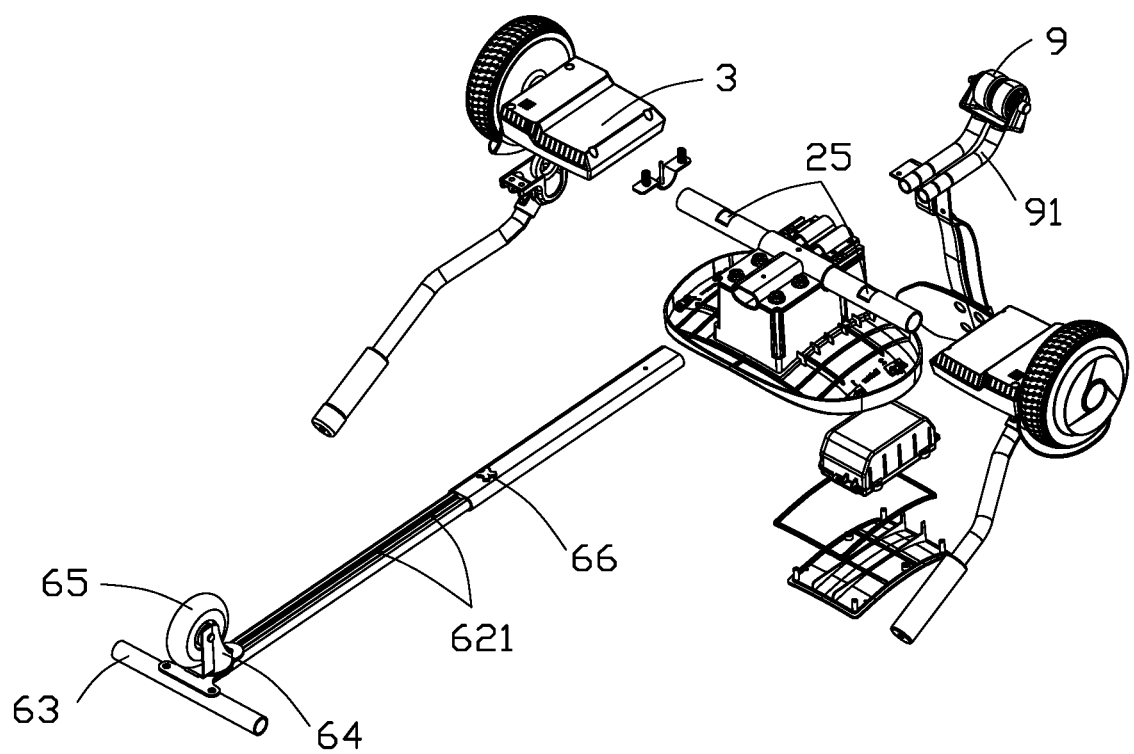
FIG. 8 is another exploded, isometric view of the electric go-kart in FIG. 1.

Referring to FIGS. 6-8, the crossbar 2 is substantially hollow. The crossbar 2 defines a first connection hole 25. The accommodation box 3 defines a second connection hole 32 corresponding to the first connection hole 25. The battery 12 is wired to the driving control system through the crossbar 2, the first connection hole 25, and the second connection hole 32 in sequence. This method of wiring the battery 12 to the driving control system prevents damage to the wiring system.

Referring to FIGS. 5 and 8, the support rod 6 extends substantially perpendicularly in front of the crossbar 2. The support bar 6 includes a fixing rod 61, an extension rod 62, and a transverse rod 63. A tail end of the fixing rod 61 is fixed to the frame 1. A tail end of the extension rod 62 is sleeved in the fixing rod 61. The transverse rod 63 is transversely fixed to a front end of the extension rod 62. A wheel mount 64 is rotatably coupled to the front end of the extension rod 62. The stabilizing wheel 65 is rotatably coupled to the wheel mount 64. The extension rod 62 defines a plurality of holes 621. The fixing rod 61 includes a locking structure 66. The fixing rod 61 is substantially hollow. The extension rod 62 can extend and retract within the fixing rod 61. The extension rod 62 can be fixed in position at different lengths by a fixing pin being inserted into one of the holes 621. The transverse rod 63 is foot-operated. A length of the extension rod 62 can be adjusted according to a user requirement. The wheel mount 64 can be rotated 360 degrees around a vertical hinge. Thus, the electric go-kart can be driven smoothly.

Figure 2:
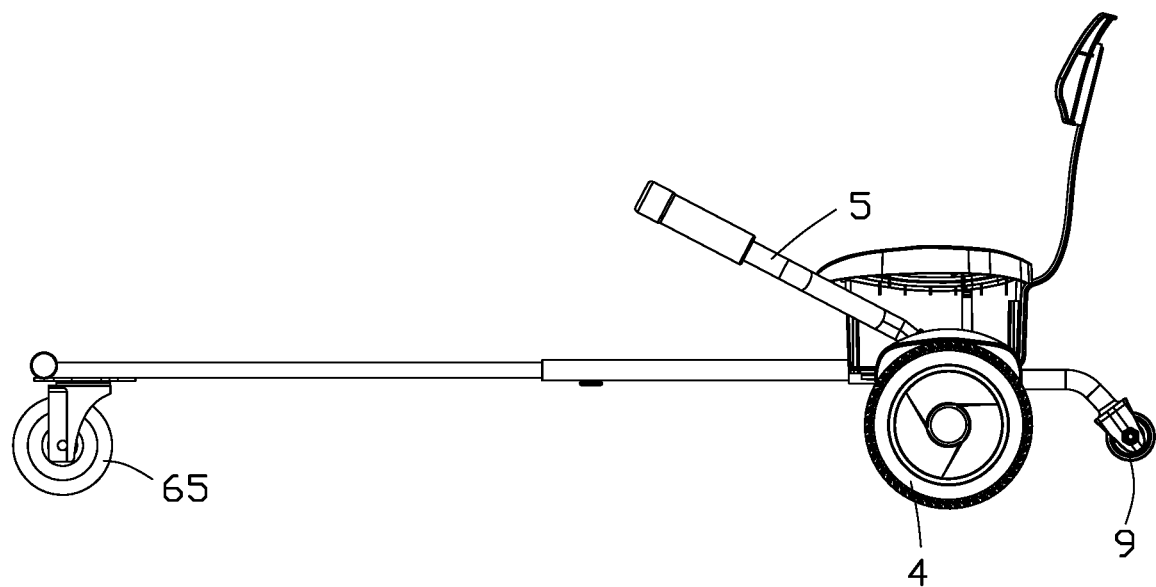
FIG. 2 is a side view of the electric go-kart in FIG. 1.
Figure 3:
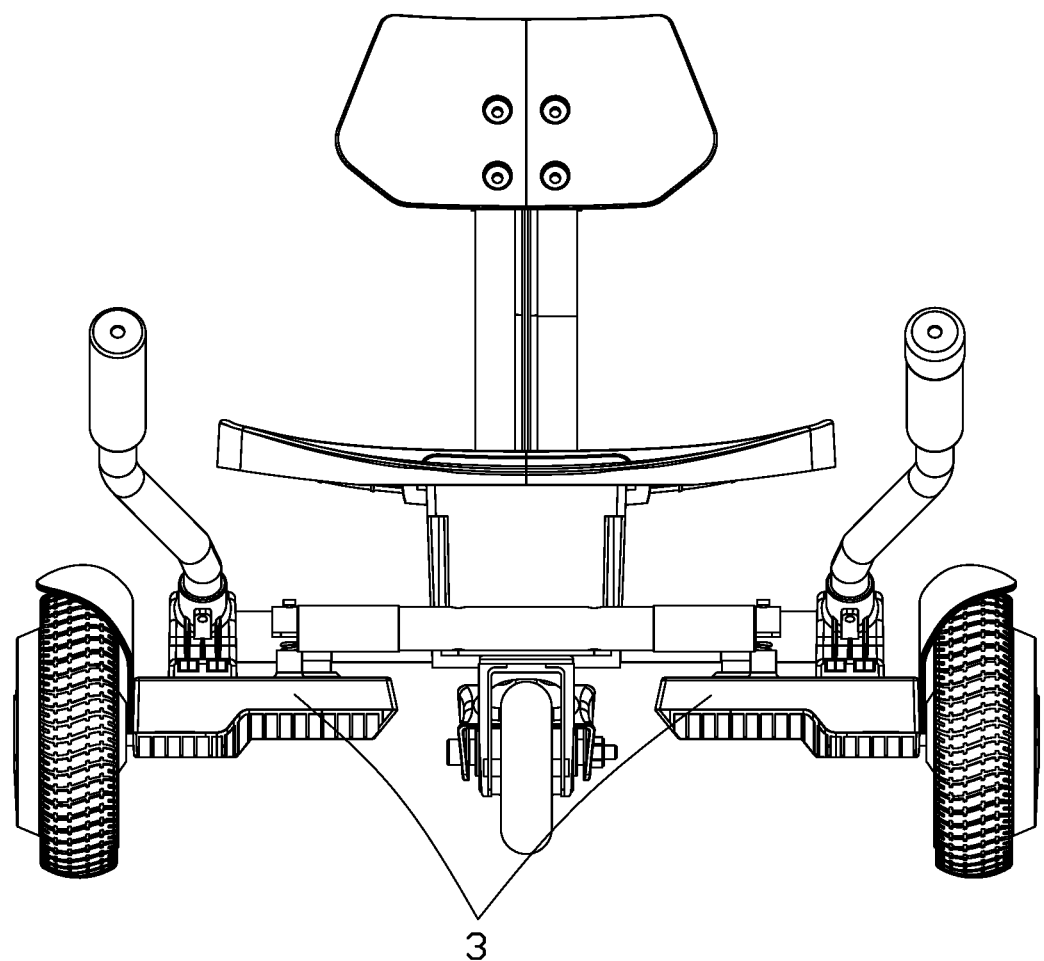
FIG. 3 is a front view of the electric go kart in FIG. 1.

Referring to FIGS. 2, 7, and 8, the electric go-kart further includes at least one rear support wheel 9 and a fixing member 91. A first end of the fixing member 91 is fixed to the frame 1. A second end of the fixing member 91 is rotatably coupled to the rear support wheel 9. The rear support wheel 9 is located behind the back support 82. During normal operation of the electric go-kart, a bottom of the rear support wheel 9 is higher than a bottom of the wheel 4. That is, the rear support wheel 9 is not normally in contact with the ground. When the electric go-kart is driven uphill or unexpectedly tilted backwards, the rear support wheel 9 contacts the ground to support the electric go-kart.

Referring to FIG. 4, when the steering rod 5 is pushed downward, the corresponding accommodation box 3 is rotated. A front end of the accommodation box 3 is lowered, and a rear end of the accommodation box 3 is lifted, thereby causing the touch switch to drive the motor to rotate the wheel 4 forward. When the steering rod 5 is lifted, the touch switch is caused to drive the motor to rotate the wheel 4 backward. When both steering rods 5 are pushed downward, the electric go-kart is driven forward. When both steering rods 5 are lifted, the electric go-kart is driven backward. In at least one embodiment, one of the steering rods 5, such as a left steering rod, includes a steer controller 55.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electric go-kart comprising:
a frame;
a crossbar fixed to the frame and extending transversely to the left and right sides of the frame;
two accommodation boxes respectively rotationally coupled to the left and right sides of the crossbar by two connectors;
two wheels, each wheel installed on an outer end of a corresponding accommodation box;
two steering rods, each steering rod comprising one end fixed to a corresponding connector;
a support rod located at a front end of the frame;
a pivotable stabilizing wheel located on a front end of the support rod;
a seat fixed on a top side of the frame; and
a battery located within the frame.

2. The electric go-kart of claim 1, wherein a cavity is defined within a middle portion of the frame for receiving the battery therein.

3. The electric go-kart of claim 2, wherein the seat defines an opening facing a top of the cavity; the seat comprises an in-seat cover having a size corresponding to a size of the opening; a seal is located between the in-seat cover and an edge of the opening.

4. The electric go-kart of claim 1, wherein the battery powers a motor of each wheel, and the motor is controlled by a driving control system of a corresponding accommodation box for driving the wheel.

5. The electric go-kart of claim 4, wherein the crossbar is hollow; a first connection hole is defined in the crossbar; a second connection hole is defined in each accommodation box; the driving control system is wired to the battery through the crossbar, the first connection hole, and the second connection hole in sequence.

6. The electric go-kart of claim 4, wherein the motor of the driving control system is switched on and off by a touch switch of the driving control system.

7. The electric go-kart of claim 1, wherein a rotation limiting structure is located on each accommodation box; the rotation limiting structure comprises at least one limiting plate; at least one column, and at least one spring.

8. The electric go-kart of claim 7, wherein the limiting plate bridges over and is fixed over the crossbar; a bottom side of two ends of the limiting plate is fixed to the spring; the column is located on a corresponding accommodation box and defines an insertion hole; a bottom portion of the spring is received within the insertion hole.

9. The electric go-kart of claim 1, wherein the support rod comprises a fixing rod, an extension rod, and a transverse rod; a tail end of the fixing rod is fixed to the frame; a tail end of the extension rod is sleeved in the fixing rod; the transverse rod is transversely fixed to a front end of the extension rod; a wheel mount is pivotably coupled to the front end of the extension rod; and the stabilizing wheel is pivotably coupled to the wheel mount.

10. The electric go-kart of claim 1, further comprising a back support; wherein the back support comprises a mounting post and a backrest; a lower end of the mounting post is fixed to the frame; the backrest is coupled to an upper end of the mounting post.

11. The electric go-kart of claim 1, further comprising at least one rear support wheel and a fixing member; wherein a first end of the fixing member is fixed to the frame; a second end of the fixing member is rotatably coupled to the at least one rear support wheel; the rear support wheel is located behind the back support.

\* \* \* \* \*